United States Patent [19]

Jones, Jr.

[11] 4,059,800

[45] Nov. 22, 1977

[54] DIGITAL MULTI-LINE COMPANDED DELTA MODULATOR

[75] Inventor: Gardner Dulany Jones, Jr., Raleigh, N.C.

[73] Assignee: International Business Machines Corporation, Armonk, N.Y.

[21] Appl. No.: 701,265

[22] Filed: June 30, 1976

[51] Int. Cl.² ............................................. H04B 1/00
[52] U.S. Cl. ........................... 325/38 B; 340/347 AD
[58] Field of Search ...................................... 325/38 B

[56] References Cited

U.S. PATENT DOCUMENTS

| 3,745,562 | 7/1973 | Rosenbaum | 340/347 AD |
| 3,895,377 | 7/1975 | Schwalenstocker | 340/347 AD |
| 3,956,746 | 5/1976 | Lisle, Jr. et al. | 340/347 AD |

*Primary Examiner*—Richard Murray

*Attorney, Agent, or Firm*—John B. Frisone

[57] ABSTRACT

A companded digital delta modulator which can encode both voice and voice band modem signals over a wide range of input levels is shown. The companding method or algorithm is based on measuring bit stream correlation and can be scaled to give substantially maximum performance over a wide range of signal type. The algorithm has a low sensitivity to digital channel errors, thus making it suitable for signal coding for satellite channels and the like. In addition, the digital design permits common hardware to simultaneously serve a large number of lines, thus permitting the substantial savings in the hardware cost per line. A further aspect of the invention concerns the ability to handle multiple bit delta modulation as well as single bit delta bit modulation in the above environment.

10 Claims, 8 Drawing Figures

FIG. 4

| CYCLES LINE k | ADDER 43 INPUTS A | ADDER 43 INPUTS B | ± CNTL 44 | SHIFT 47 | OUTPUT A0 46 | REGISTERS 40 | REGISTERS 41 | REGISTERS 42 | REGISTERS 60 |
|---|---|---|---|---|---|---|---|---|---|
| $k_0$ | | | | | | $S_{m-1}$ | $\Delta_{m-1}$ | $d_{i-1}$ | $S_{m-1}$ |
| $k_1$ | $S_{m-1}$ | $S_{m-1}$ | (−) | $m_1$ (1/32) | $\beta_3 S_{m-1}$ | " | " | " | " |
| $k_2$ | $\beta_3 S_{m-1}$ | $\Delta_{m-1}$ | $d_i$ | $m_3$ | $\beta_3 \cdot S_{m-1} + d_i \cdot \Delta_{m-1} \cdot \beta_2$ | $S_m$ | " | " | " |
| $k_3$ | $\Delta S_{m-1}$ | $\Delta_{m-1}$ | (−) | $m_2$ (1/28) | $\beta_1 \Delta_{m-1}$ | " | " | " | " |
| $k_4$ | $d_i \times d_{i-1}$ | $\beta_1 \Delta_{m-1}$ | (+) | 0 | $\beta_1 \Delta_{m-1} + d_i \times d_{i-1}$ | " | " | " | " |
| $k_5$ | A0 | Pr | (−) | 0 | $\beta_1 \Delta_{m-1} + d_i \times d_{i-1} - Pr$ | " | $\Delta_m$ | $d_i$ | " |
| $k_6$ | | | | | | " | " | " | " |

FIG. 6

| CYCLES LINE k | ADDER INPUTS A | ADDER INPUTS B | ± CNTL | SHIFT | OUTPUTS A0 | S | Δ | d | DAC |
|---|---|---|---|---|---|---|---|---|---|
| $k_0$ | | | | | | $S_{m-1}$ | $\Delta_{m-1}$ | $d_{i-1}$ | $S_{m-1}$ |
| $k_1$ | $S_{m-1}$ | $S_{m-1}$ | (−) | $m_1$ | $\beta_3 S_{m-1}$ | " | " | " | " |
| $k_2$ | A0 | $\Delta_{m-1}$ | $d_{0i}$ | $m_3$ | $A0 + d_{0i} \Delta_{m-1} \times \beta_2$ | " | " | " | " |
| $k_3$ | A0 | $\Delta_{m-1}$ | $d_{1i}$ | 1 | $A0 + d_{1i} \frac{\Delta_{m-1}}{2}$ | " | " | " | " |
| $k_4$ | A0 | $\Delta_{m-1}$ | $d_{2i}$ | 2 | $A0 + d_{2i} \frac{\Delta_{m-1}}{4}$ | " | " | " | " |
| $k_5$ | A0 | $\Delta_{m-1}$ | $d_{3i}$ | 3 | $A0 + d_{3i} \frac{\Delta_{m-1}}{8}$ | $S_m$ | " | " | " |
| $k_6$ | COMPUTE $\Delta_m$ IN SAME MANNER AS SINGLE BIT CODING USING HIGHEST ORDER CODE BITS $d_{0i}$ AND $d_{0i-1}$ | | | | | | | | |
| $k_9$ | | | | | | | | | |

DIGITAL MULTI-LINE COMPANDED DELTA MODULATOR

BACKGROUND

1. Field of the Invention

The invention relates to delta modulators in general and, more particularly, to delta modulators suitable for handling voice and voice band modem signals and to a digitally implemented delta modulator of the type which is also suitable for handling on a time-sharing basis a plurality of analog lines which may require delta coding in either single or multiple bit modulation.

2. Description of the Prior Art

Delta modulation has historically offered a less expensive approach for digitizing analog signals than PCM. This advantage exists primarily to the cost differences between the relatively simple analog filters used with delta modulation and the more critical Nyquist bandwidth filters required for PCM. When applied to coding analog signals for digital transmission on channels with potentially high error rates, delta modulation offers perhaps a more significant advantage than coder cost in being less sensitive to channel errors than conventional PCM. In the important coding rate range of 24 to 40 Kbits/sec. this robustness makes delta modulation potentially the most cost effective coding approach for channels where the error rates can degrade to $10^{-2}$ levels. Such an application would be satellite transmission systems where under rain conditions degraded operation with high channel error rates can be experienced.

In order to achieve suitable voice quality in the 24 to 40 Kbs coding range a delta coder like PCM must have some means of adapting its gain to the level of the analog input signal to be encoded. The design of the adaptation or companding method or algorithm greatly affects the error sensitivity of the delta code and determines which types of signals can be encoded. FIG. 1 illustrates a block diagram for a conventional delta coder and includes a comparator 1, a latch 2 responsive to a sample clock, a multiplier 3 for multiplying the output of latch 2 by a signal Δ generated by a companding circuit 4 responsive to the output of latch 2 and a signal filter 5 whose output is the quantized representation of the analog input signal. The function of the companding or adaptation algorithm circuit 4 is to adjust the feedback step size such that the modulator provides the maximum signal to quantizing noise ratio SNR for large variation in the RMS value of the signal. An algorithm in common use (U.S. Pat. No. 3,699,566) performs this function by increasing the step size by a discrete amount upon detection of overload as evident by a pattern in the code (i.e. a run of N ones or N zeros) and decreasing the step size if overload has not occurred within a prescribed period of time. At the decoder the step size is increased or decreased accordingly from the same information in the code. Such an algorithm operates on differential gain in that the decoder derives gain change information from the received code. No information is available at the decoder as to the actual value of the step size at the encoder other than through the past history of gain changes which have occurred. If an error is produced in the digitally coded signal, it can result in an erroneous step size calculation at the decoder. Such errors result in distortions in the received signal and are more damaging subjectively than the additive background noise which occurs in non-adaptive delta modulators due to channel errors.

When an error is produced in the decoder step size value, an offset will exist between the encoder and decoder gains until some mechanism occurs to resynchronize the two values since no absolute gain reference is conveyed in the transmitted coded signal. Differential gains algorithms are suitable for coding speech signals because envelope gaps in the waveform are sufficiently wide and occur sufficiently often to allow both the decoder and decoder to reach their maximum gain value (minimum step size) and thus resynchronize. Since voice band modems signals have constant envelopes with no gaps they cannot be encoded with coders using differential gain algorithms. A single digital channel error could cause a sufficiently large increase in decoder gain to saturate the output signal to the receiving modem for the remainder of the transmission with no direct means of recovery.

A delta modulator which overcomes the above problems is disclosed by Betts at page 547 of the IEEE Transactions on Communication Technology, August, 1971. The disclosed modulator employs a direct gain companding algorithm. That is, the gain used in decoding the transmitted digital signal can be directly computed from the digital bit stream. This technique reduces the sensitivity of the coding process to channel errors and more importantly the algorithm allows the encoding of constant envelope signal such as occur with modem signals. The coder designed, however, is not suitable for use in a time sharing environment in which common components are time shared across a substantial number of lines.

SUMMARY OF THE INVENTION

The invention contemplates a delta modulator which employs a direct gain companding algorithm in which the gain to be used in coding and decoding the digital signals is directly computed from the digital bit stream. The algorithm is implemented in digital form and is suitable in the form implemented for use on a time sharing basis amongst a plurality of lines, each having analog input signals. The modulator employs an algorithm which can encode both speech signals and signals from modems of the type commonly used in voice bandwidth telephone channels. The performance of such modems operating through this type modulator will depend on the sampling frequency used. The algorithm is also suitable for multi-bit delta encoding for applications requiring finer signal resolution than is obtainable with conventional single bit delta modulation.

BRIEF DESCRIPTION OF THE DRAWINGS

FIG. 4 is a chart illustrating the operation of the delta coder shown in FIG. 3.

FIG. 6 is a chart illustrating the modifications required to the block diagram of FIG. 3 for handling multiple bit encoded delta signals.

DESCRIPTION OF THE PREFERRED EMBODIMENTS

Figure 1:
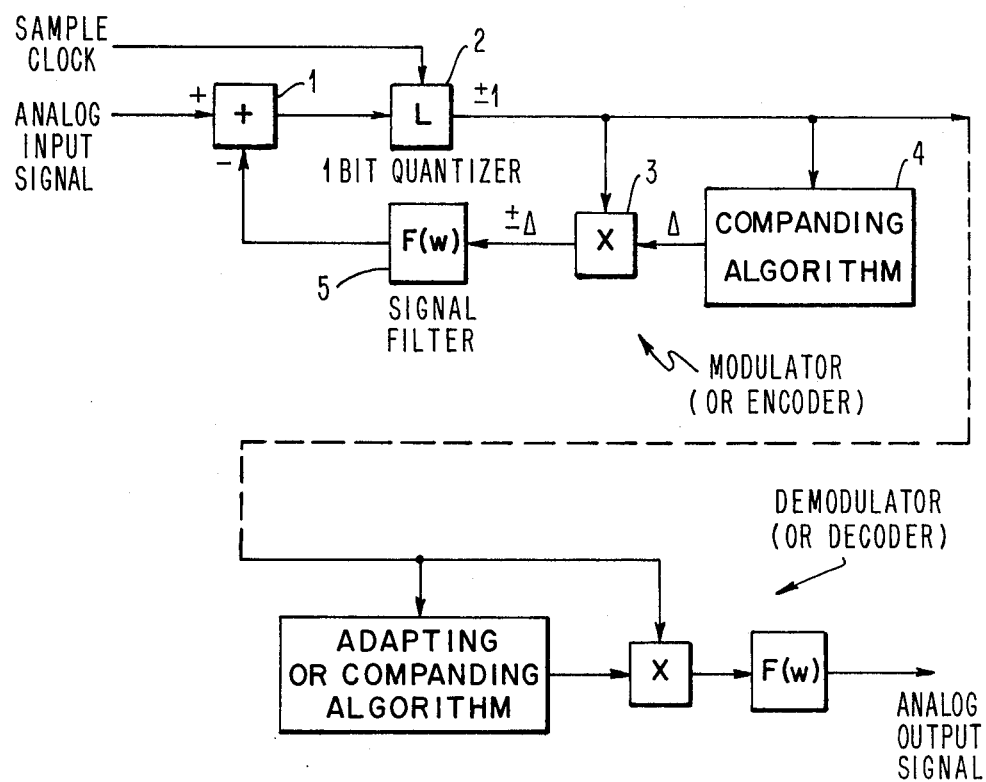
FIG. 1 is a block diagram of a conventional prior art delta modulator and demodulator.
Figure 2A:
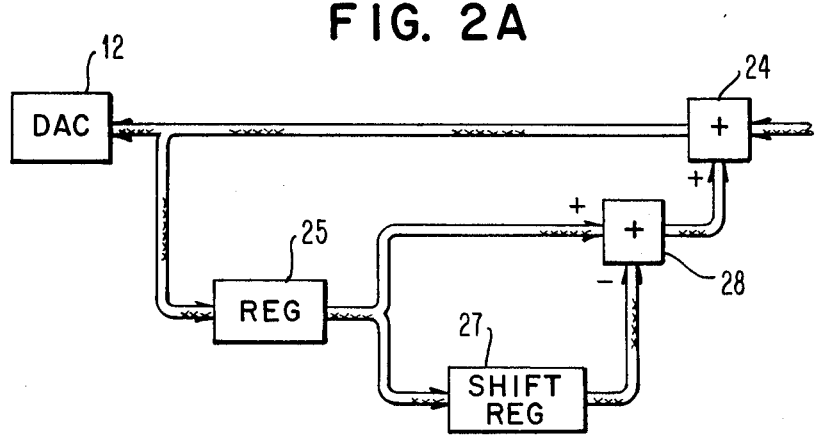
FIG. 2A is a block diagram illustrating a variation in the block diagram of FIG. 2.
Figure 2:
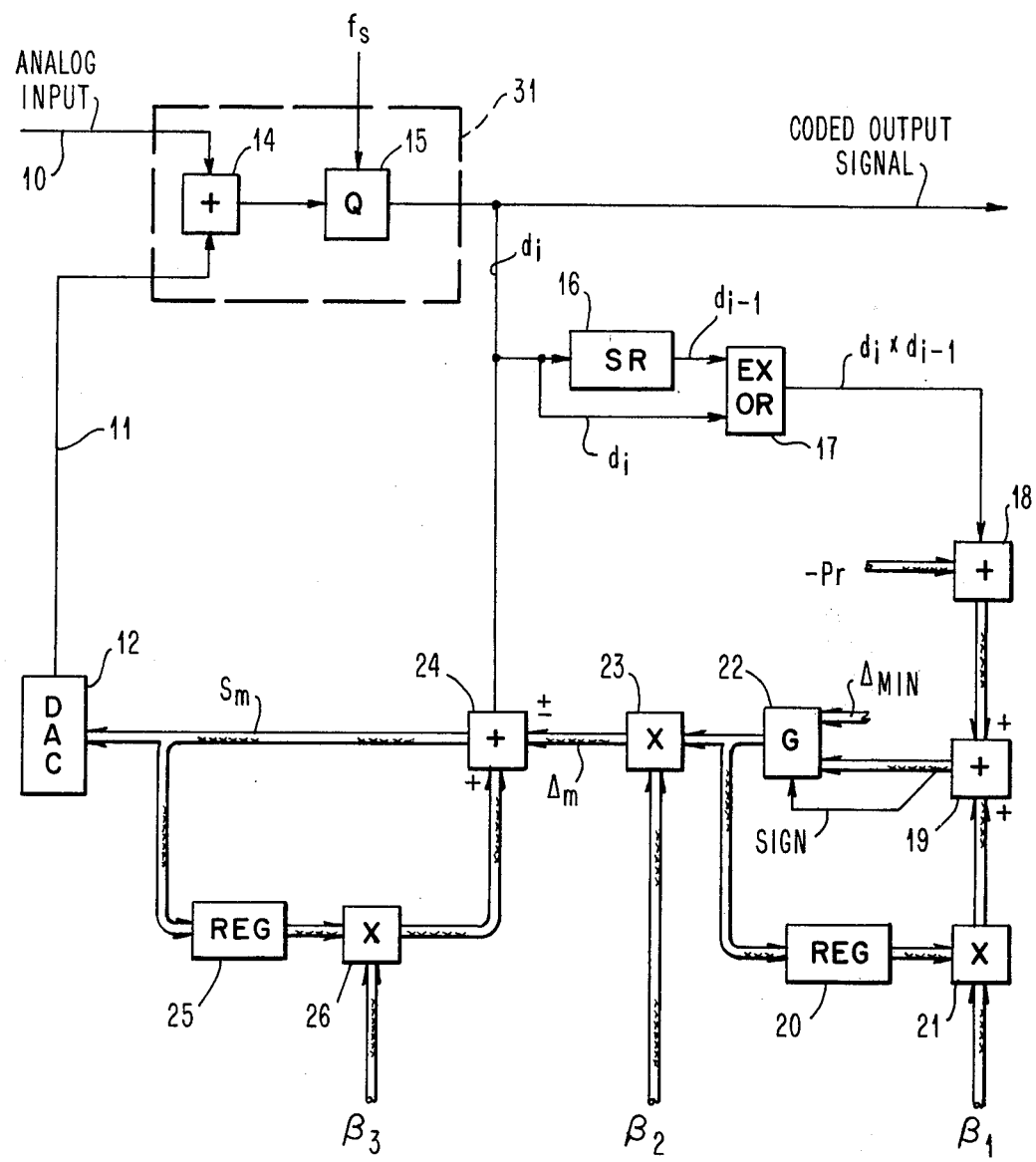
FIG. 2 is a block diagram of a delta modulator constructed in accordance with the invention.

In FIG. 2, an analog input signal such as voice or a modem signal on a conductor 10 and a feedback signal on a conductor 11 from a digital to analog converter 12 are applied to a summing circuit 14 which provides an output indicative of the difference between the signals on conductors 10 and 11. The output of summing circuit 14 is applied to a quantizing circuit 15 which is sampled by a clock at frequency FS. The output of quantizing circuit 15 constitutes the encoded output signal of the delta modulator and represents in two level digital format the analog input signal on conductor 10. This output is called $d_i$ at any instant in time.

The output $d_i$ from circuit 15 is applied to a one-bit shift register 16 which at any instant in time stores the previous bit or state of latch 16. The output $d_i$ and the output of shift register 16 $d_{i-1}$ are applied to the two inputs of exclusive OR circuit 17 which equals the product of the quantitites $d_i$ and $d_{i-1}$. This single bit output is applied to a summing circuit 18 which receives a multi-bit value labeled $-Pr$. Pr is a selected reference which determines the modulation density in the coded output signal. The output of summing circuit 18 is applied to an adder 19 which receives at its other input the contents stored in a register 20 which have been multiplied in a multiplier circuit 21 by a coefficient $\beta_1$. The current output of adder 19 will be inserted in register 20 in the next cycle of operation if that output is positive. The contents of register 20 are for convenience sake called $\Delta_{m-1}$, the outputs of adder 19, $\Delta_m$. In order to prevent the circuit from going negative, and not recovering, the output of adder 19 is applied via a gate 22 to the input of register 20. Gate 22 in response to the sign bit of adder 19 switches either the output of adder 19 or a value $\Delta_{MIN}$ to the input of register 20. The sign bit when negative causes the $\Delta_{MIN}$ value to be applied to the input of register 20. If the sign bit is positive, the $\Delta_m$ value supplied by adder 19 is applied to the input of register 20. The output of gate 22 is applied to one input of the multipliers 23 and multiplied by a scaling factor $\beta_2$ to provide the $\Delta_m$ output modified by the constant $\beta_2$.

Register 20, multiplier 21, and adder 19 constitute a first order digital recursive filter. The adder 19 adds the input digital signal $\Delta_m$ to a previous filter output value $\Delta_{m-1}$ weighted by a coefficient $\beta_1$ which in connection with the sampling frequency FS determines the filter bandwidth. An adder 24 under control of the $d_i$ signal from quantizer 15 forms the sum or difference from the output of multiplier 23 $\Delta_m$ and a signal $S_{m-1}$ stored in a register 25 which has been multiplied in a multiplier 26 by a coefficient $\beta_3$. The output of adder 24 is applied to the previously described digital to analog converter circuit 12. Here, as before, register 25, multiplier 26 and adder 24 comprise a first order digital recursive filter, the bandwidth of which is determined by the coefficient $\beta_3$ and the sampling frequency.

The adaption or companding algorithm consists of controlling the step size $\Delta_m$ in such a manner as to maintain a prescribed average density in the coded signal. This is done by multiplying adjacent bits of the coded signal $d_i \times d_{i-1}$ adding to this a reference value $-Pr$ and averaging the sum to give the step size $\Delta_m$ at the output of multiplier 23 after being scaled by the gain factor $\beta_2$. The basis of the adaption is to maintain the average value of $d_i \times d_{i-1}$ equal to the prescribed reference $Pr$. This can be done over a wide range of input levels by having a sufficiently high scaling factor $\beta_2$. The algorithm can be summarized by the mathematical expression for the calculation of the step size $\Delta_m$ and the feedback signal $S_m$ discussed in the previous paragraphs. These relations are given below.

$$\Delta_m = \beta_2(\beta_1\Delta_{m-1} + d_i \times d_{i-1} - Pr)$$

$$S_m = \beta_3 S_{m-1} - (\text{SIGN } d_i)\beta_2\Delta_{m-1}$$

As stated above, register 20, multiplier 21 and adder 19 comprise a first order recursive digital filter. Register 25, multiplier 26 and adder 24 also comprise a recursive digital filter. These filters include multipliers such as 21 and 26. The implementation of a multiplier is substantially more costly than an adder and the circuits shown in FIG. 2A may be used in lieu of that disclosed in FIG. 2. The circuit illustrated in FIG. 2A does not utilize multipliers and accomplishes substantially the same result with minor limitations set forth below with the use of a shift circuit and an additional adding function. In those instances where a single adder is time shared to provide all other required additions, the circuit illustrated in FIG. 2A results in substantial cost savings. In FIG. 2A the digital to analog converter 12, the adder 24, and the adder 25 described above in connection with FIG. 2 are reproduced to illustrate the relationship of the components illustrated in FIG. 2A. Multiplier 26 may be replaced by a shift register 27 connected to the output of register 25 and is designed to provide a fixed shift with digital signal supplied by register 25. The shifted signal in shift circuit 27 is subtracted from the signal from register 25 in an adder 28, the output of which is applied to the input of adder 24 previously described in FIG. 2. With this arrangement the value of $S_{m-1}$ stored in register 25 is in effect multiplied by the coefficient $\beta_3$. Obviously, the technique imposes some limits on the values available. However, adequate performance may be obtained with minor or no degradation in performance. Multiplier 23 may be replaced by a simple shift circuit similar to that illustrated in FIG. 2A at 27. This will perform the same function as multiplier 23 and provides the equivalent of the multiplication by the constant $\beta_2$.

Figure 3:
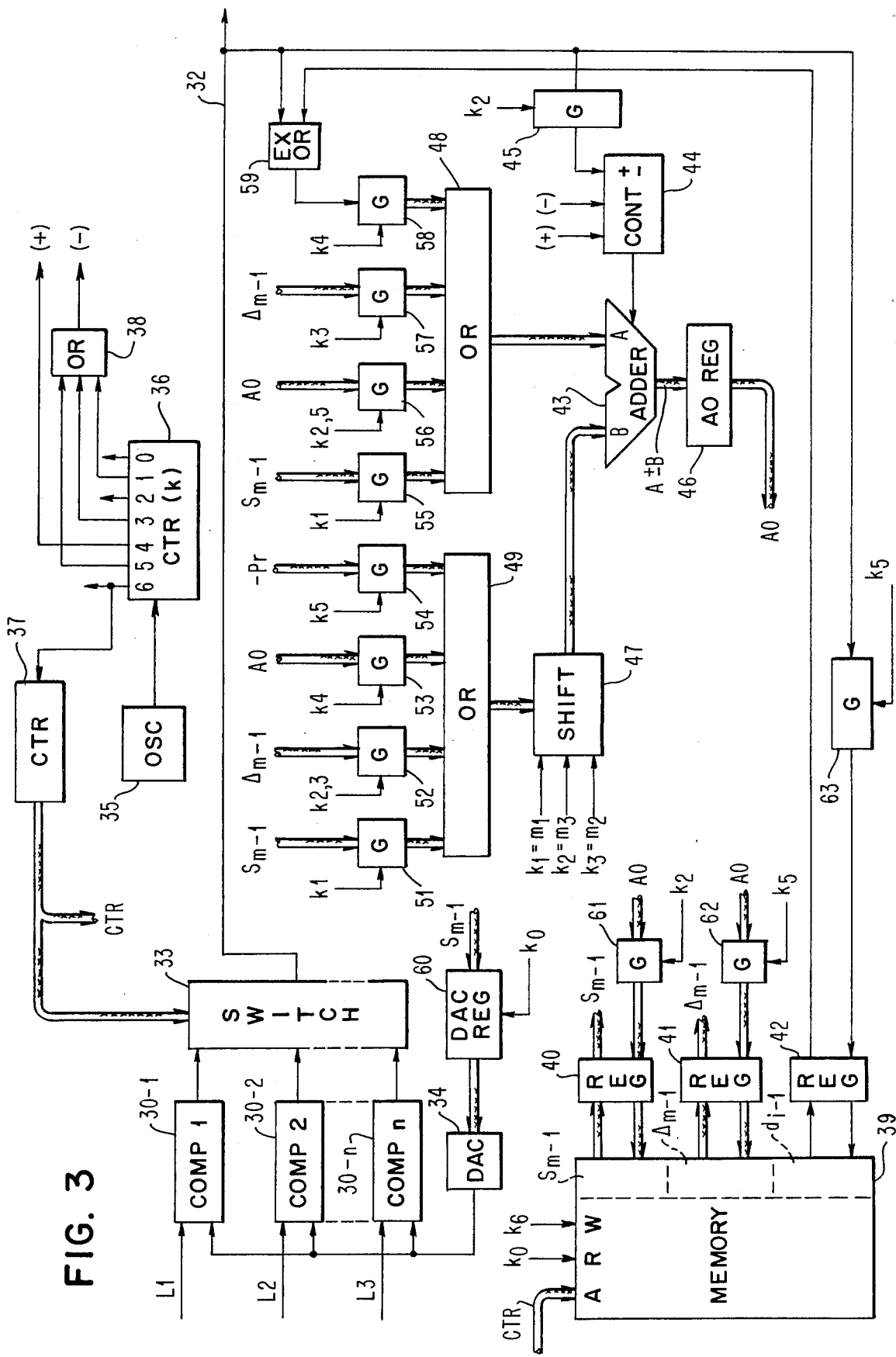
FIG. 3 is a block diagram of a delta modulator constructed in accordance with the invention for simultaneously modulating the analog signals on a plurality of lines on a time sharing basis.

The implementation illustrated in FIG. 3 is a multiline configuration in which the coder is time shared amongst $n$ lines L$l$ through L$n$. The coder performs the same function as that illustrated in FIG. 2 for each of the lines. However, the modification illustrated in FIG. 2A is employed for the recursive filters described in FIG. 2.

In FIG. 3, lines L$l$ through L$l$ carrying analog signal which may be either voice or modem signals are applied to a plurality of comparing circuits 30-$l$ through 30-$n$ respectively. Circuits 30-$l$ through 30-$n$ may be identical to the circuits included in the dash box 31 of FIG. 2. The outputs of these circuits are selectively and sequentially connected to the output 32 by a switch 33. A digital to analog converter 34 similar to converter 12 of FIG. 2 is connected to the other inputs of the comparing circuits 30-$l$ through 30-$n$. The appropriate value for each of the n lines will reside in the digital to analog converter 34 when that line is connected to the output 32 by the switch 33. How this is accomplished will become apparent as the description continues.

An oscillator 35 is connected to a counter 36. Counter 36 is illustrated with seven sequential outputs on seven consecutive pulses of oscillator 35. The seventh sequential output from counter 36 is connected to a second counter 37 which counts in sequence to N and resets. The outputs from counter 37 are applied to switch 33 and, as is well known in the art, establishes a connection from comparing circuit 30-l through the switch when the counter value is at some predetermined value. In sequence, as the counter increments, due to the recycling of counter 36 successive circuits 30 are connected through switch 33 to the output 32. The first, third and fifth outputs of counter 36 are connected via an OR gate 38 and provide an output labeled minus. The fourth output from counter 36 is labeled plus. Utilization of these two outputs will be described later. In addition, the utilization of the other outputs will be described later.

The values $S_{m-1}$, $\Delta_{m-1}$ and $d_{i-1}$ previously described in connection with FIGS. 2 and 2A are stored for each of the lines in a random access memory 39 under the control of the output of counter 37 which constitutes the address of the line being serviced. The values of $S_{m-1}$, $\Delta_{m-1}$ and $d_{i-1}$ are read from memory 39 into registers 40, 41 and 42 respectively upon the occurrence of the k0 output of counter 36.

As stated above, all of the functions described in FIG. 2 may, with the modifications illustrated in FIG. 2A, be implemented with either an addition or subtraction. In the multi-line time-shared modification illustrated in FIG. 3, this technique is utilized. A single adder 43 and an add-subtract control circuit 44 perform all of the additions and subtractions required on an interleaved time-shared basis for each line and for the successive lines in succession. The plus, minus outputs described above are applied to the plus, minus control circuit 44 and the $d_i$ output signal from switch 33 is applied via a selector gate 45 upon the occurrence of the k2 output from counter 36. The output of adder circuit 43 is inserted in an AO register 46, the output of which is labeled AO. The two inputs of adder 43 are labeled B and A. A shifting circuit 47 is connected to the B input of adder 43. This circuit passes any input without shifting during all time periods except k1, k2 and k3. During these three periods three different shifts $m_1$, $m_3$ and $m_2$, respectively, are affected upon the input signal or data applied to the input of the shifting circuit 47. These three shifts correspond to required shifts described above in connection with FIG. 2A for effecting multipliation by the constants $\beta_1$, $\beta_2$ and $\beta_3$. A pair of OR gates 48 and 49 are utilized for combining the various inputs to the A and B inputs of adder 43.

A gate 51 connects the $S_{m-1}$ output from register 40 to OR gate 49 during the k1 output from counter 36. A gate 52 connects the $\Delta_{m-1}$ output from register 41 to OR circuit 49 during the k2 and k3 outputs of counter 36. A gate 53 connects the AO output from register 46 to the OR circuit 49 during the k4 output of counter 36. A gate 54 connects the $-Pr$ reference previously described in connection with the description of FIG. 2 to the OR circuit 49 during the k5 output of counter 36. A gate 55 connects the $S_{m-1}$ output from register 40 to OR circuit 48 during the k1 output of counter 36. A gate 56 connects the AO output from register 46 to OR circuit 48 during the k2 and 5 outputs of counter 36. A gate 57 connects the $\Delta_{m-1}$ output from register 41 to the OR circuit 48 during the k3 output of counter 36. A gate 58 connects the output of an Exclusive OR circuit 59 which is identical in structure and function to Exclusive OR circuit 17 described above in connection with the description of FIG. 2 to the OR circuit 48 during the k4 output of counter 36. Exclusive OR circuit 59 receives the $d_i$ output on output 32 and the $d_{i-1}$ output from register 42. Thus, it receives the exact same inputs as Exclusive OR circuit 17 described above. The $S_{m-1}$ output from register 40 is applied at k0 time to a digital to analog converter register 60 which is connected to the digital to analog converter circuit 34 which provides the input to the comparison circuit 30-l through 30-n. In operation when a new value $S_{m-1}$ is calculated, it is inserted in the memory 39. The next time the line is serviced the value previously calculated is inserted in register 40. This is immediately transferred to register 60 which now comprises the new value of $S_m$ for controlling the one input of the comparison circuits 30-l through 30-n on a sequential time sharing basis. During the cycle a new value of $S_{m-1}$ is calculated according to the steps illustrated in the chart of FIG. 4. After the new values have been calculated, they are inserted into the registers 40, 41 and 42 under control of the k2, k5 and k6 outputs of counter 36. The new value of $S_{m-1}$ resident in AO register 46 is inserted in register 40 during the k2 output of counter 36 via a gate 61. The new value of $\Delta_{m-1}$ resident in AO register 46 is inserted into register 41 upon the k5 output of counter 36 via a gate 62 and the new value $d_{i-1}$ is inserted in register 42 upon the k5 output of counter 36 via a selector gate 63. At the occurrence of the k6 output of counter 36 the k6 output applied to the write controls of memory 39 causes the new values previously or concurrently inserted in registers 40, 41 and 42 to be inserted in the appropriate memory address selected by the output of counter 37, thus, the memory contents for the line identified by the counter 37 output are updated at this time in preparation for the next subsequent servicing of that particular line.

The table illustrated in FIG. 4 shows the inputs to adder 43 during the counter cycles k0 through k6. Inputs to control circuits 44 and shift register 47. The output of register 46 and the contents of registers 40, 41 and 42 and 60 during the same time periods.

During the k0 period the values of $S_{m-1}$, $\Delta_{m-1}$ and $d_{i-1}$ are read from memory 39 and inserted in registers 40, 41 and 42. In addition, the value $S_{m-1}$ is inserted in register 60 where it remains for the remainder of the processing cycle k0 through k6. During the k1 period the value $S_{m-1}$ is applied to both the A and B inputs of adder 43. The value $S_{m-1}$ inserted at the B input through gate 51 and OR circuit 49 is shifted by a fixed amount $m_1$ and subtracted under control of the k1 output via OR circuit 38 and control circuit 44 from the input applied to the A input via gate 55 and OR circuit 48, thus yielding the value $\beta_3 \times S_{m-1}$ previously described in connection with FIG. 2. The results reside in register 46 and during the k2 period are inserted into the A input via gate 56 or gate 48. During the k2 period the value $\Delta_{m-1}$ from register 41 is inserted into the B input via gate 52 and OR circuit 49 and is shifted in shifter 47 during k2 by an amount $m_3$ and the value of $d_i$ then present on the output 32 determines the sign of the addition, yielding at the output register 46 the quantity $\beta_3 \times S_{m-1} + d_i \times \Delta_{m-1} \times \beta_2$. The $d_i$ set forth under the output column in register 46 is the sign value utilized in the last term since $d_i$ is either + or − $l$ and determines the nature of the addition performed in this step. This value is at this time inserted in register 40 under control of the k2 output via gate 61 and is the full equivalent of the $S_m$ value described in FIG. 2. This will comprise the subsequent $S_{m-1}$ value in the next cycle of operation. During the k3 time period the value $\Delta_{m-1}$ from register 41 is inserted into the A and B inputs via gates 57 and 52. The value inserted into the B input of adder 43 is shifted by $m_2$ positions and a substract operation is performed under control of the k3 output applied to the control circuit 44 via OR gate 38. This operation yields $\beta_1 \times \Delta_{m-1}$. During the k4 time period the output $d_i \times d_{i-1}$ from Exclusive OR circuit 59 is applied to the A input via gate 58 and the contents of the AO register 46, the results of the previous calculation, are applied to the B input via gate 53. At this time an addition takes place under control of circuit 44 and the k4 output from counter 36. No shifting takes place during this cycle. This cycle yields a value $\Delta_1 \times \Delta_{m-1} + d_i \times d_{i-1}$. This value resident in the AO output of register 46 is applied to the A input during the k5 times period with the constant Pr. A subtraction takes place under control of the k5 output of counter 36 via OR gate 38 and control circuit 44. No shifting takes place at this time and the results of the computation yield $\Delta_m$ which equals $\beta_1 \times \Delta_{m-1} + d_i \times d_{i-1} - Pr$. This vlaue is inserted into register 41 under control of the k5 output of counter 36 and is the full equivalent of the value $\Delta_m$ described in connection with FIG. 2. At the same time the $d_i$ value present on output 32 is applied via gate 63 under control of the k5 output from counter 36 into register 42 and comprises the $d_{i-1}$ value used in the next calculation. The $\Delta_m$ value inserted in register 41 comprises the $\Delta_{m-1}$ value for the next cycle of operation for this line. As described above, during the k6 output of counter 36 the values previously inserted in registers 40, 41 and 42 are written into the memory in the address selected by the then output of counter 37.

Figure 3A:
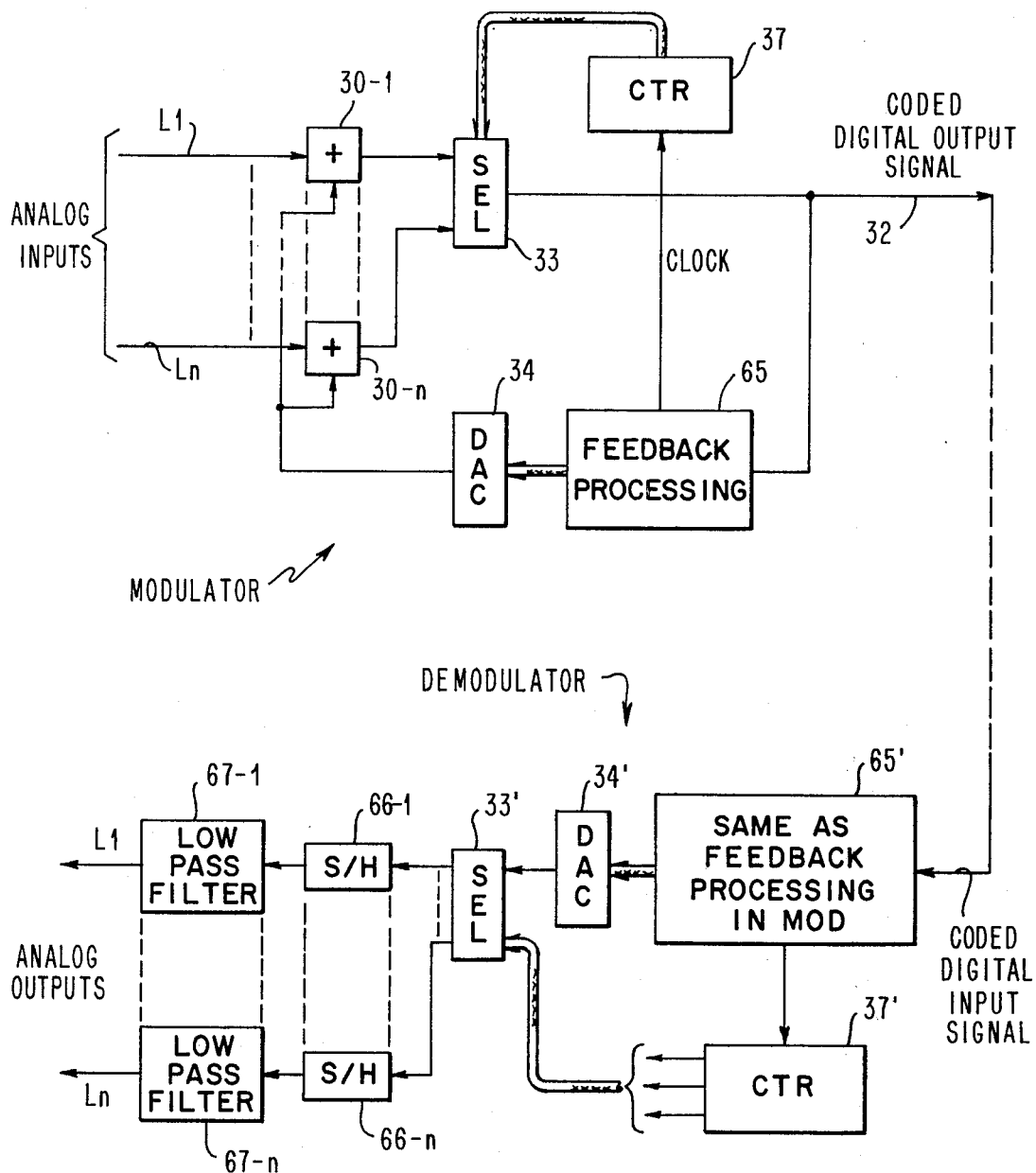
FIG. 3A is a block diagram illustrating a delta coder and a delta decoder constructed according to FIG. 3.

FIG. 3A is included to illustrate the embodiment shown in FIG. 3 in a complete system utilizing both a coder and a decoder. The coder includes n line L1 through Ln connected to n comparators 30-1 through 30-n driven by the digital to analog converter 34 which is time shared amongst the lines. Selector switch 33 and counter 37 for operating selector switch 33 are separately illustrated. The remaining circuits illustrated in FIG. 3 are included in the feedback processing block illustrated at 65. The output signal on output 32 is conducted across a digital transmission channel to a demodulator circuit which is identical to the feedback processing module 65 in the coder. A counter 37' identical to counter 37 drives a selector switch 33' identical to selector switch 33 in the coder. Selector switch 33' is connected to n sample and hold circuits 66-1 through 66-n which drives n lines L1-Ln via n low pass filters 67-1 through 67-n.

Figure 5:
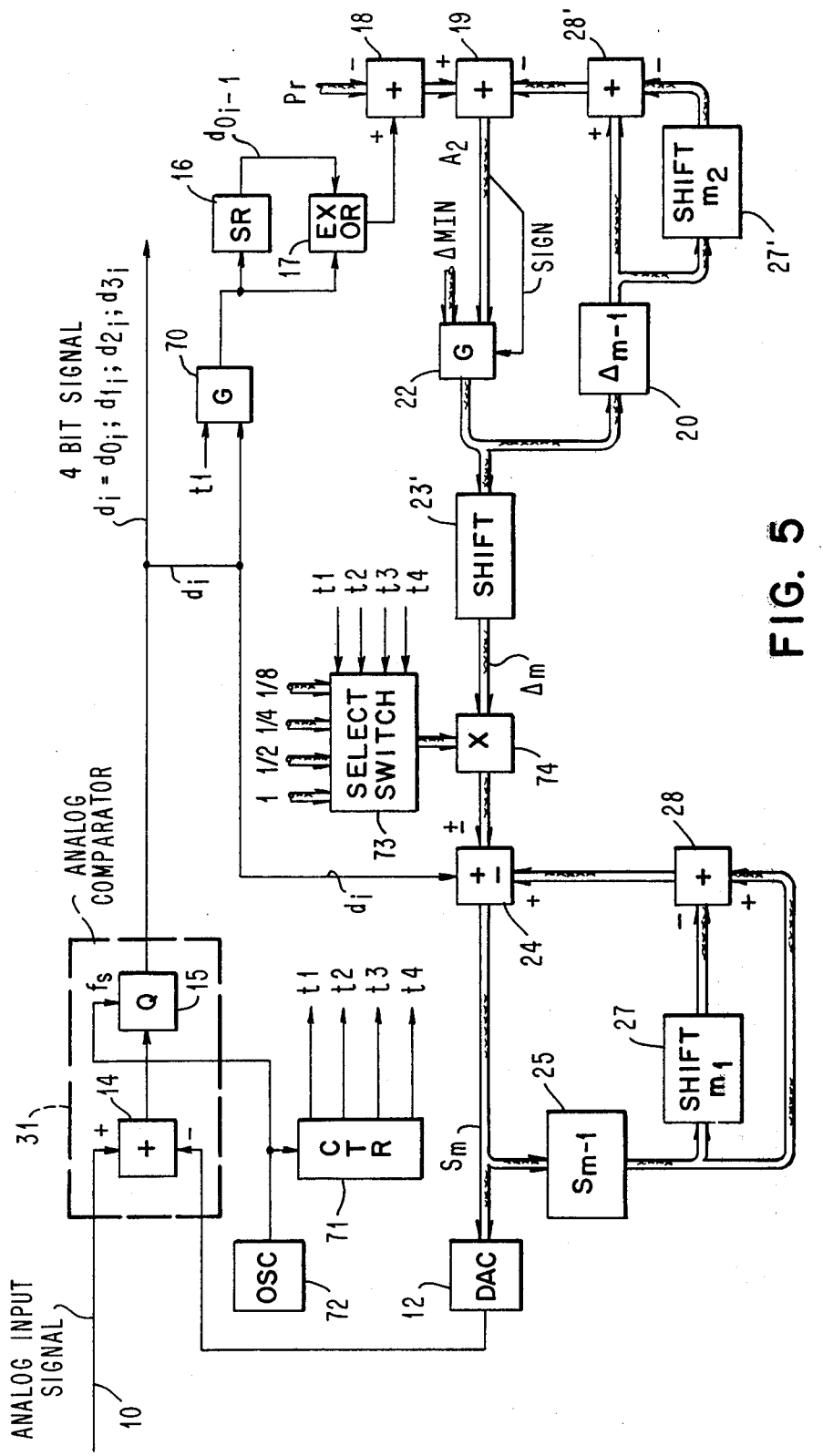
FIG. 5 is a block diagram similar to FIG. 2 showing the modifications required to FIG. 2 for processing multiple bit delta coded signals as opposed to single bit delta coded signals.

The circuit illustrated in FIG. 5 is suitable for providing multiple bit delta modulation of an analog input signal on a single line. FIG. 5 and the subsequent description of multi-bit coding uses the example of a 4-bit code. It is obvious that the technique is applicable to other level codes. The circuit is in most respects similar to the circuit illustrated in FIG. 2 as modified by FIG. 2A. Therefore, in the interests of brevity, those circuits which are identical in performance are identified by the same reference numerals as used in FIGS. 2 and 2A. In the instance of the recursive filter alternate used in lieu of multiplier 21 the reference numerals have been primed so that they may be distinguished from those used in lieu of multiplier 26 as illustrated in FIG. 2A. The description which follows will be limited to the changes made in the circuit to accommodate the multiple bit delta modulation function as opposed to a single bit delta modulation function. In FIG. 5, the multiplication performed by multiplier 23 of FIG. 2 is performed a described previously by a shifting circuit 23' which shifts the output from gate 22 an appropriate amount to effect the multiplication by the constant $\beta_2$. This output is held constant for four successive sample times T and then permitted to change again for the next four sample times. This is accomplished by a gate 70 and a counter 71. Counter 71 recycles on a four count basis, thus, four cycles of an oscillator 72 which supplies the sampling frequency $f_s$ are required for the counter 71 to recycle. The T1 output from counter 71 is applied to gate 70, thus, processing through those circuits subsequent to gate 70, that is, shift register 16, Exclusive OR 17 and the following circuits to generate $\Delta_m$ occurs only once for every four cycles of oscillator 72. The value $\Delta_m$ is multiplied by the quantities 1, ½, 174 and ⅛ in each of the cycles of counter 71, that is, cycles T1, T2, T3 and T4, respectively. This is accomplished by providing these reference quantities via a selection switch 73 to a multiplier 74 connected to the output of shifting circuit 23'. In lieu of the selection switch 73 and multiplier 74 an additional shifting circuit may be employed which shifts a reference value by a selected amount during each of the time periods T1, T2, T3 and T4. This technique eliminates the need for a multiplier and replaces the multiplication function with an addition function, thus permitting the use of the circuit illustrated in FIG. 3 for implementing the circuit of FIG. 5 on a multi-line basis. This is accomplished in accordance with the table illustrated in FIG. 6. The format used in FIG. 6 is identical to that used in FIG. 4. A modification of counter 36 is required to provide ten outputs k0 through k9 in order to complete all of the calculations in the allocated time. Steps k6 through k9 are identical to and correspond to steps k3 through k6 in FIG. 4.

While the invention has been particularly shown and described with reference to preferred embodiments thereof, it will be understood by those skilled in the art that various changes in form and details may be made therein without departing from the spirit and scope of the invention.

What is claimed is:

1. A delta modulator comprising:
   a first means for comparing the amplitudes of an analog input signal and an analog feedback signal and periodically providing a first or a second output signal voltage $d_i$ as a function of said comparison;

second means for forming the product of the output signal $d_i$ of the current period and the output signal of the next prior period $d_{i-1}$;

third means for summing the said product during each period with a digital reference signal;

a first digital recursive filter means responsive to the output of said third means for generating a gain control signal $\Delta_m$;

fourth means responsive to the output from said first means and said first filter means output for generating a digital signal which is a function of the said gain control signal;

a second digital recursive filter responsive to the said fourth means for providing a digital feedback signal; and a digital to analog converter responsive to the said second filter output for providing the said analog feedback signal.

2. A delta modulator as set forth in claim 1 in which: said first digital recursive filter includes;

an adder means having an output, a first input connected to said third means and a second input, gate means connected to the said output of said adder means and a signal source for passing the adder output when the sign of the adder output is positive and the signal from said source when it is negative, a register connected to the output of the gate means for storing a signal computed in the next prior period of operation, a first multiplier means for multiplying the registered value by a constant $\beta_1$ and applying the modified value to the second input of the adder means, and a second multiplier means for multiplying the output of the gate means by a constant $\beta_2$, and said second digital recursive filter includes;

a register connected to the output of said fourth means for storing a signal computed in the next prior period of operation; and a third multiplier for multiplying the registered value by a constant $\beta_3$ and supplying the results of the multiplication to the fourth means, the output of which is supplied to the said digital to analog converter means.

3. A delta modulator as set forth in claim 2 in which said fourth means is an adder for forming the algebraic sum of the second and third multiplier output and in which the state of the output of the first means determines the sign of the second multiplier output.

4. A delta modulator as set forth in claim 1 in which: said first digital recursive filter includes;

an adder means having an output, a first input connected to said third means and a second input, gate means connected to the said output of said adder means and a signal source for passing the adder output when the sign of the adder output is positive and the signal from said source when it is negative, a first register connected to the output of the gate means for storing a signal computed in the next prior period of operation, a second shifting register means connected to the output of said first register for shifting the output therefrom by a predetermined amount, second adder means for subtracting the outputs of the first and second registers and applying the difference to second input of the first adder means, and a second shifting register means for shifting the output of the gate means by a predetermined amount, and said second digital recursive filter includes;

a first register means connected to the output of said fourth means for storing a signal computed in the next prior period of operation, a second shifting register means connected to the output of said first register means for shifting the output therefrom by a predetermined amount, and an adder means for subtracting the outputs of the first and second registers and supplying the difference to the fourth means the output of which is supplied to the said digital to analog converter.

5. A delta modulator as set forth in claim 4 in which said fourth means is an adder for forming the algebraic sum of the outputs from said second shifting means and said second recursive filter adder means and in which the state of the output of the said first means determines the sign of the addition.

6. A delta modulator for concurrently modulating in a time division manner a plurality of analog signals each appearing on one of a plurality of different lines and comprising:

a plurality of first means, one for each said line, for comparing the amplitute of the analog signal on the line and an analog feedback signal from a common source and each periodically providing a first or a second output signal voltage $d_i$ as a function of said comparison;

switching means for connecting said first means in a repetitive time sequence to an ouput channel;

a memory including at least one segment of addressable storage for each line for storing parameters including the state of the output signal $d_{i-1}$ for the last processing period for the line, a feedback signal $S_{m-1}$ and a gain control signal $\Delta_{m-1}$ both calculated from the two next prior states of the output signal $d_i$;

of addresses corresponding to the number of lines being serviced and with each said address a plurality of control clock pulses the first of which access the stored past history for the line being serviced;

means for applying said address signals to the said switch and memory means;

means for converting the accessed feedback signal $S_{m-1}$ to an analog signal as the said common source signal applied to the said plurality of first means;

processing means under control of the said plurality of control clock pulses for calculating new values for $S_{m-1}$, $\Delta_{m-1}$ and $d_{i-1}$ based on a predetermined algorithm, the current output $d_i$ and the prior values of $S_{m-1}$, $\Delta_{m-1}$ and $d_{i-1}$; and means responsive to the last of said plurality of control clock pulses for storing the said calculated values in the memory at the then indicated address.

7. A delta modulator as set forth in claim 6 in which said processing means under control of the said plurality of control clock pulses includes:

an adder having a first and second input and an output, an output register connected to said adder output, a control means connected to the adder and responsive to the control signals for controlling the function of the adder, a shift register means connected to one of the adder inputs and responsive to control signals for selectively shifting the data inputs to the shift means and to the said adder input as a function of the control signals applied thereto;

a first plurality of selector gates connected to the adder output register, the stored data in the memory accessed for each line, and a reference signal and controlled by said plurality of control clock pulses for selectively applying the above signals to the adder input via the shifting mechanism, circuit means responsive to the output of the switch means and the accessed $d_{i-1}$ signal for providing the product of the two;

a second plurality of selector gates connected to the output register associated with the adder output and the accessed contents of the memory and the output of the said multiplication circuit means and controlled by the said plurality of control clock pulses for selectively applying the above said values to the other input of the adder whereby the said algorithm is executed in the adder under control of the control mechanism and the shifter and the control clock pulses from the clock means.

8. A delta modulator as set forth in claim 7 in which the said clock means provides seven sequential control clock pulses the first pulse of which is used to access from memory and provide data at the address then attained by the said address provided by the clock means, the second, third, fourth, fifth and sixth control pulses operating said first and second plurality of selector gates and the seventh pulse causing the calculated values to be store in the memory at the location from whence the prior values were read; and said algorithm performing the following steps in the said adder during the second through sixth control clock pulse times;

| Control Clock Pulses k | Inputs First | Inputs Second | Control Means ± | Shift Means | Output AO |
|---|---|---|---|---|---|
| k1 | $S_{m-1}$ | $S_{m-1}$ | (−) | $m_1$ | $\beta_3 \cdot S_{m-1}$ |
| k2 | $\beta_3 S_{m-1}$ | $\Delta_{m-1}$ | (+/−)$d_i$ | $m_3$ | $\beta_3 S_{m-1} + d_i \Delta_{m-1} \beta_2$ $= S_m$ |
| k3 | $\Delta_{m-1}$ | $\Delta_{m-1}$ | (−) | $m_2$ | $\beta_1 \Delta_{m-1}$ |
| k4 | $d_i x d_{i-1}$ | $\beta_1 \Delta_{m-1}$ | (+) | 0 | $\beta_1 \Delta_{m-1} + d_i x d_{i-1}$ |
| k5 | AO | −Pr | (−) | 0 | $\beta_1 \Delta_{m-1} + d_i x d_{i-1} - Pr = \Delta_m$ |

9. A multi-bit delta modulator comprising:
first means for comparing the amplitudes of an analog input signal and an analog feedback signal and periodically providing a first or a second output signal voltage $d_i$ as a function of said comparison, oscillator means operating at said periodic rate for sampling the said first means to effect the periodic comparison and for driving a counter means said counter means including as many stages as the multi-bit modulation;

gate means responsive to the first output from said counter for connecting the output $d_i$ to a second means once per cycle of operation of said counter means;

said second means responsive to the output of the said gate means for forming the product of the output signal $d_i$ provided by the gate means and the output signal of the next prior period of operation $d_{i-1}$;

third means for summing the said product during each period with a digital reference signal;

a first digital recursive filter means responsive to the output of said third means for generating a gain control signal;

shift register means responsive to the gain control signal from the first digital recursive filter for shifting the output therefrom by a predetermined amount;

dividing means responsive to the output of said shift register means and to the counter output for providing a unity output during the first output from said counter and a different fraction thereof during the remaining counts of said repetitive counter output;

fourth means responsive to the output from said dividing means and the said first means for generating in each period of counter operation $n$ digital signals which are a decreasing function of the said gain control signal;

a second digital recursive filter responsive to the output from said fourth means for providing $n$ sequential digital feedback signals per cycle of counter operation; and a digital to analog converter responsive to the said second digital filter output providing the said analog feedback signal.

10. A delta modulator as set forth in claim 9 in which:
said first digital recursive filter includes;
an adder means having an output, a first input connected to said third means and a second input,
gate means connected to the said output of said adder means and a signal source for passing the adder output when the sign of the adder output is positive and the signal from said source when it is negative,
a first register connected to the output of the gate means for storing a signal computed in the next prior period of operation,
a second shifting register means connected to the output of said first register for shifting the output therefrom by a predetermined amount, and
second adder means for subtracting the outputs of the first and second registers and applying the difference to the second input of the first adder means, and
said second digital recursive filter includes;
a first register means connected to the output of said fourth means for storing a signal computed in the next prior period of operation,
a second shifting register means connected to the output of said first register means for shifting the output therefrom of a predetermined amount, and
an adder means for subtracting the outputs of the first and second registers and supplying the difference to the fourth means the output of which is supplied to the said digital to analog converter.

* * * * *